No. 747,644. PATENTED DEC. 22, 1903.
H. ROSENBERG.
VESSEL FOR CONTAINING VARNISH OR THE LIKE.
APPLICATION FILED MAY 24, 1902.

NO MODEL.

Witnesses:
John A. Rennie
George Barry Jr.

Inventor:
Herman Rosenberg
by attorneys

THE NORRIS PETERS CO., PHOTO-LITHO., WASHINGTON, D. C.

No. 747,644.

Patented December 22, 1903.

UNITED STATES PATENT OFFICE.

HERMAN ROSENBERG, OF NEW YORK, N. Y., ASSIGNOR TO STANDARD VARNISH WORKS, OF NEW YORK, N. Y., A CORPORATION OF NEW YORK.

VESSEL FOR CONTAINING VARNISH OR THE LIKE.

SPECIFICATION forming part of Letters Patent No. 747,644, dated December 22, 1903.

Application filed May 24, 1902. Serial No. 108,786. (No model.)

*To all whom it may concern:*

Be it known that I, HERMAN ROSENBERG, a citizen of the United States, and a resident of the borough of Manhattan, in the city and State of New York, have invented a new and useful Improvement in Vessels for Containing Varnish or the Like, of which the following is a specification.

The object of this present invention is to provide means for preventing the formation of a skin on the surface of varnish and the like after the vessel has been opened and the liquid contained therein exposed. This skin is formed by chemical action, such as the natural oxidizing action of the air when the varnish is exposed to it or by the evaporation of the varnish. I prevent this chemical action and consequent formation of a skin on the surface of the varnish by providing a reservoir for a volatile liquid—such, for instance, as turpentine, benzene, or alcohol—which reservoir is in communication with the interior of the vessel containing the varnish, so that the space within the vessel not occupied by the varnish may be completely filled with the fumes or vapor formed by the evaporation of the volatile liquid in the reservoir.

A practical embodiment of my invention is represented in the accompanying drawings, in which—

Figure 1:
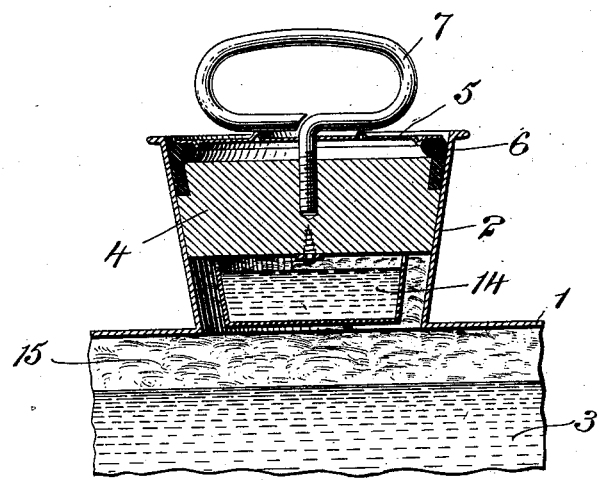
Figure 2:
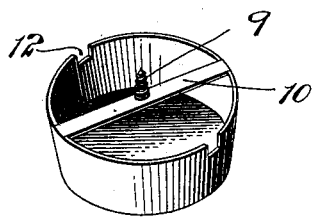
Figure 3:
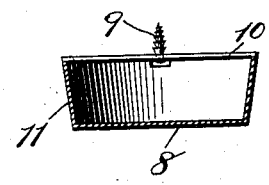
Figure 4:
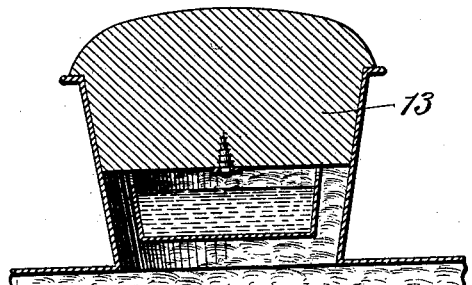

Figure 1 represents in vertical section a portion of a vessel containing varnish or the like in which the mouth thereof is closed by a novel stopper, the reservoir for containing the volatile liquid being shown secured to the bottom of the stopper. Fig. 2 is a perspective view of the reservoir. Fig. 3 is a vertical central section through the same; and Fig. 4 is a sectional view of a portion of a vessel for containing varnish and the like, the mouth of the same being closed by a stopper of ordinary construction and the volatile liquid-receiving reservoir being secured to the bottom of the same.

The vessel for containing varnish and the like is denoted by 1, and it has the usual mouth 2 uprising from its top.

The varnish or like liquid is denoted by 3, the surface of which in the present instance is shown a short distance below the top of the vessel.

The stopper represented herein comprises a tapered plug 4, fitted to the interior of the mouth 2 of the vessel, a bearing-plate 5, an interposed elastic ring 6, and a hand-screw 7 for securing and releasing the stopper.

The reservoir for the volatile liquid is located within the vessel and is in communication with the interior thereof. In the present instance I have shown the reservoir as comprising a pan 8, removably secured to the bottom of the plug 4 of the stopper by means of a screw 9, carried by a cross-bar 10, the ends of which are secured to the top of the side walls 11 of the pan. Open communication is established between the interior of the pan and the interior of the vessel when the pan is secured to the stopper and the stopper is in position within the mouth of the vessel through one or more openings located at or near the top of the pan. In the present instance these openings are formed by cutting notches in the top of the side wall 11 of the pan.

It is evident that the reservoir may be made in a great many different shapes and sizes and that it may be secured within the vessel in a great many ways, the gist of the invention lying in the fact that the interior of the reservoir is in open communication with the interior of the vessel.

In Fig. 4 I have shown the reservoir as removably secured to the bottom of the stopper 13, such as is usually furnished with varnish-cans.

The operation of my invention is as follows: After the permanent cap (not shown herein) has been removed from the mouth of the vessel containing the varnish or like liquid the temporary stopper may be used for closing the said mouth. This temporary stopper is provided with the removable reservoir 8. This reservoir 8 is released from the stopper and may be filled with a volatile liquid 14—such, for, instance, as turpentine, benzene, or alcohol. The reservoir is again attached to the stopper. When the stopper has been placed in position to close the mouth of the vessel, the fumes or vapor 15 arising from the evaporation of the volatile liquid within the reservoir will escape from the reservoir into the interior of the vessel not occupied by the varnish and will completely fill the said space irrespective of the amount of varnish within the vessel. It has been found that these fumes or vapor will absolutely prevent a skin forming upon the surface of the varnish and that the varnish will be kept at a uniform consistency irrespective of the amount within the vessel. Furthermore, the varnish may be kept a considerable length of time without danger of becoming hardened or thickened as long as the reservoir is kept supplied with a volatile liquid.

What I claim is—

A stopper for liquid-containing vessels comprising a plug and a reservoir for containing a volatile liquid removably secured to the bottom of the plug for substantially closing the reservoir, the said reservoir being provided with openings through its walls for establishing communication between the interior of the reservoir and the interior of the vessel in connection with which the stopper is used.

In testimony that I claim the foregoing as my invention I have signed my name, in presence of two witnesses, this 20th day of May, 1902.

HERMAN ROSENBERG.

Witnesses:
L. MENDES,
CHARLES A. STEIN.